United States Patent [19]

Kawamura et al.

[11] Patent Number: 4,905,369
[45] Date of Patent: Mar. 6, 1990

[54] TOOL CHANGER

[75] Inventors: Toshihito Kawamura, Kariya; Akira Matsuzawa, Toyota, both of Japan

[73] Assignee: Toyoda Koki Kabushiki Kaisha, Kariya, Japan

[21] Appl. No.: 236,727

[22] Filed: Aug. 26, 1988

[30] Foreign Application Priority Data

Aug. 27, 1987 [JP] Japan .................... 62-213669

[51] Int. Cl.⁴ .............................................. B23Q 3/57
[52] U.S. Cl. .................................... 29/568; 29/26 A
[58] Field of Search ........................... 29/26 A, 568

[56] References Cited

U.S. PATENT DOCUMENTS

| 3,292,235 | 12/1966 | Riedel et al. | 29/568 |
| 3,541,677 | 11/1970 | Fiegler | 29/568 |
| 3,949,462 | 4/1976 | deCaussin | 29/568 |
| 4,338,709 | 7/1982 | Straub et al. | 29/26 A |
| 4,649,610 | 3/1987 | Onishi et al. | 29/26 A |

*Primary Examiner*—Z. R. Bilinsky
*Attorney, Agent, or Firm*—Oblon, Spivak, McClelland, Maier & Neustadt

[57] ABSTRACT

A tool changer has a rotatably supported driving shaft, a cylindrical double-walled support member composed of an inner cylindrical wall and an outer cylindrical wall, disposed coaxially with the driving shaft, and engaged therewith through helical splines, a cylindrical guide member having a cylindrical portion interposed between the inner cylindrical wall and outer cylindrical wall, a plurality of claw members fixed to the outer cylindrical wall for retaining tools, and a servomotor for rotating the driving shaft clockwise and counterclockwise. In an outer periphery of the cylindrical portion of the guide member are formed a plurality of axially extending straight grooves, each having an inclined side surface at respective tip ends, which extends in one direction, and an engaging member biassed by a spring member projects into one of the straight grooves so as to be engaged therewith. The clockwise rotation of the driving shaft causes the support member to move forwardly in an axial direction while the engaging member is engaged with one of the straight grooves of the guide member. At an end of the forward movement of the support member, the engaging member leaves the straight groove after passing the inclined side surface so as to rotate the support member by a predetermined angular distance and to bring the engaging member into engagement with another one of the straight grooves. The succeeding counterclockwise rotation of the driving shaft causes the support member to move backwardly.

8 Claims, 3 Drawing Sheets

TOOL CHANGER

BACKGROUND OF THE INVENTION

1. Field of the Invention

The present invention relates to a tool changer for changing tools between a spindle and a tool storage magazine.

2. Description of the Prior Art

Some of tool changers are provided with a rotary tool strage magazine for indexing a desired tool to the spindle, respectively. Conventionally, a plurality of cylinder-piston mechanisms and gear-cam mechanisms have been used for rotating the magazine, mounting and dismounting tools on or from the spindle.

U.S. Pat. No. 3,292,235 shows one example of the conventional tool changer. In the device of U.S. Pat. No. 3,292,235, two piston and cylinder mechanism are used for actuating the magazine in its horizontal and vertical movements, and a gear-cam mechanism is used for effecting the rotational indexing movement of the magazine. And for operating these mechanisms, two motors are provided.

Therefore, the structure of the tool changer of U.S. Pat. No. 3,292,235 becomes complex and the size thereof becomes large. Moreover, since it is required to operate the above described two motors for effecting the tool changing operation, the number of the operation steps becomes increased, and accordingly troublesome.

SUMMARY OF THE INVENTION

It is an object of the present invention to provide a tool changer of a small size and a simple structure, by which the tool changing operation can be effected by a decreased number of operation steps and which can be produced at a low production cost.

The tool changer according to the present invention has a frame, a driving shaft rotatably carried by the frame in parallel relation with the axis of a tool spindle, a tool support member carried by the frame in coaxial relation with the driving shaft for rotation about the driving shaft as well as for reciprocative movement in the axial direction of the driving shaft, the tool support member being provided at a circumferential portion thereof with a plurality of tool holding mechanisms for respectively removably holding a plurality of tools, feed means provided between the driving shaft and the tool support member for axially moving the tool support member between first and second positions where the tool support member is respectively close to and away from one end of the tool spindle, stopper means for defining the second position, first guide means provided between the frame and the tool support member for guiding the tool support member to move axially between the first and second positions, second guide means provided between the frame and the tool support member for guiding the tool support member to rotate in only one direction when the rotation of the driving shaft in one direction continues even after the tool support member reaches the second position, and drive means connected to the driving shaft for rotating the same in the one direction and the other direction respectively.

In operation, a previously used tool attached to the tool spindle is held by one of the tool holding mechanisms when the spindle is returned to a tool change position from a machining zone. When the drive means is then operated to rotate the driving shaft in one direction, the tool support member is axially moved from the first position to the second position by the operation of the feed means provided between the driving shaft and the tool support member while being guided by the first guide means. This results in the used tool being dismounted from the tool spindle. When the tool support member reaches the second position defined by the stopper means, the tool support member is rotated in one direction together with the driving shaft through a predetermined angular distance by the operation of the second guide means so that another tool holding mechanism holding a new tool is brought into axial alignment with the spindle. Then, the drive means is operated to rotate the driving shaft in the other direction. Due to this rotation of the driving shaft, the tool support member is guided by the first guide means to be axially moved from the second position to the first position by the operation of the feed means. This axial movement of the tool support member causes the new tool to be inserted into the spindle. And the new tool is released from the another tool holding mechanism due to the movement of the spindle from the tool change position toward the machining zone.

According to the present invention, the axial movement and the rotation of the tool support member for changing tools between the spindle and the tool holding mechanism can be effected by only rotating the driving shaft in one direction and the other direction by virtue of the first guide means and the second guide means. Therefore, the tool changer according to the present invention can be made small in size and simple in structure, and the number of operation steps for changing tools can be decreased. Moreover, the production cost of the tool changer according to the present invention can be reduced.

DETAILED DESCRIPTION OF THE EMBODIMENT

Hereinafter, an embodiment of a tool changer according to the present invention will be described with reference to the drawings.

Figure 1:
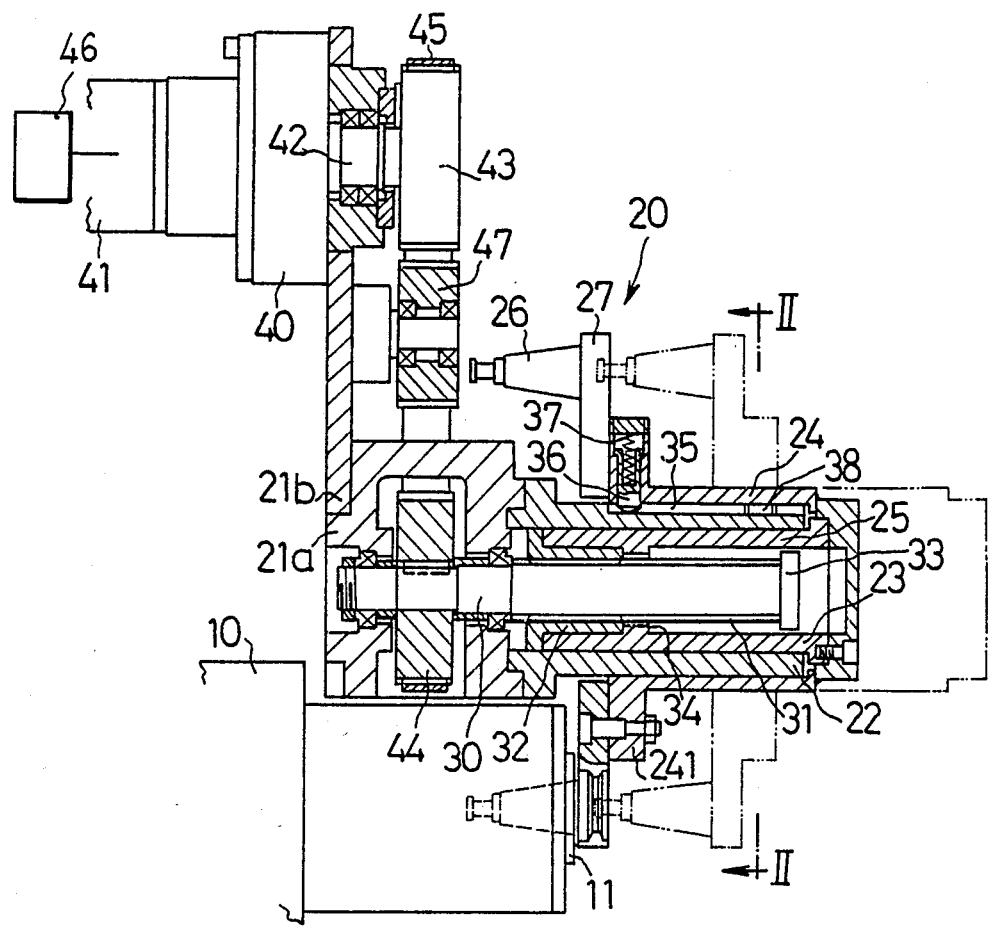
FIG. 1 is a sectional view of one embodiment of a tool changer according to the present invention.

In FIG. 1, a tool changer 20 has a frame or base 21a which is fixed on a column (not shown) vertically guiding a spindle head 10. To the base 21a is fixed one end of a guide sleeve or member 22 of a cylindrical shape, whose axis extends in parallel relation with the axis of a tool spindle 11. The other end portion of the guide member 22 is formed into a thin-walled cylindrical portion, into which a bottomed support member 23 is inserted at an inner cylindrical wall 25 thereof so as to be turnable and axially movable along the guide member 22. The support member 23 has double cylindrical walls. An outer cylindrical wall 24 of the support member 23 extends to encircle the outer surface of the thin-walled cylindrical portion of the guide member 22.

Figure 2:
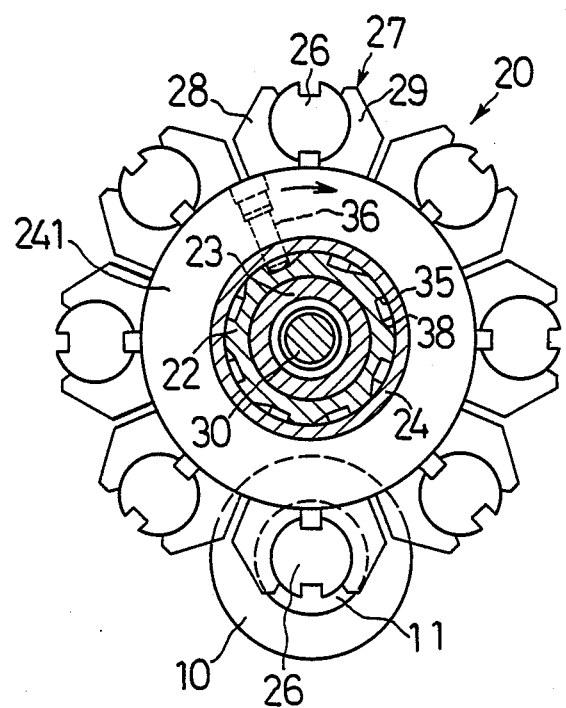
FIG. 2 is a sectional view taken along the line II—II of FIG. 1.

An open end portion of the outer cylindrical wall 24 is integrally formed with a flange portion 241. And as shown in FIG. 2, a plurality of tool holding mechanisms 27, each composed of a pair of claw pieces 28 and 29, are fixed to the flange portion 241 at equal angular distances along the circumference thereof for holding a plurality of various tools 26. These claw pieces 28 and 29 are normally biassed to a closed position by a spring force. The flange portion 241 and the tool holding mechanisms 27 constitute a tool magazine for the tools 26.

Within the flange portion 241, an engaging member 36 is accommodated and baissed by a spring member 37 radially inwardly of the guide member 22.

On the outer surface of the thin-walled cylindrical portion of the guide member 22 are formed a plurality of axially extending thin straight grooves 35 of the same number as that of the tool holding mechanisms 27 at angular positions which respectively correspond to the tool holding mechanisms 27. And in the state shown in FIG. 1, the engaging member 36 is engaged with one of the straight grooves 35 to prevent the rotation of the support member 23.

A driving shaft 30 is rotatably carried by the base 21a at its base portion. The remaining portion of the driving shaft 30 is inserted into the support member 23, and a helical spline 31 is formed on the outer surface thereof. And a stopper 33 for stopping the movement of the tool support member 23 along the driving shaft 30, is integrally formed at an end of the driving shaft 30. The internal surface of an end portion of the inner cylindrical wall 25 of the support member 23 is formed with a helical spline 32, which is engaged with the helical spline 31 of the driving shaft 30. At the internal surface of the middle of the inner cylinder wall 25 is formed a stopper surface 34, which is engageable with the stopper 33 of the driving shaft 30. The helical spline 31 has such a helix angle that when the driving shaft 30 rotates by a predetermined amount in the direction of the arrow in FIG. 2, the axially moving stopper surface 34 is brought into engagement with the stopper 33.

Each of the straight grooves 35 has a rectangular cross section except for one portion near the tip end of the guide member 22. At that portion, each straight groove 35 is connected with an escape groove 38 which has an inclined bottom surface extending from a bottom surface of each straight groove 35 to the outer surface of the guide member 22 in one rotational direction of the support member 23 as shown by the arrow in FIG. 2.

A servomotor 41 provided with a reduction gear mechanism 40 is mounted on a base plate 21b secured to the base 21a, and an output shaft 42 of the mechanism 40 is provided with a toothed pulley 43. Another toothed pulley 44 is keyed on the driving shaft 30, and a toothed belt 45 is wound around the toothed pulleys 43 and 44 by way of a tension pulley 47.

An absolute encoder 46 is connected to the servomotor 41 for detecting the turn angle of the servomotor 41.

Hereinafter, the operation of the tool changer having the above described construction will be explained.

When a previously used tool 26 is to be changed with another tool, the spindle head 10 is upwardly moved along the column to bring the spindle 11 rotatably carried therein into a tool change position as shown in FIG. 1, whereby the used tool 26 in the spindle 11 is brought into axial alignment with one of the tool holding mechanisms 27 of the tool magazine. At this time, the previously used tool 26 mounted on a tip end of the spindle 11 forcibly opens a pair of closed claw pieces 28 and 29 located thereover against the spring force and enters into the pair of claw pieces 28 and 29 so as to be held by the same.

Next, the servomotor 41 is rotated clockwise to rotate the driving shaft 30 in the same direction by the predetermined amount. The rotation of the driving shaft 30 is transmitted to the support member 23 through the helical splines 31 and 32. At this time, the engaging member 36 remains engaged with one of the straight grooves 35 to prevent the rotation of the support member 23. Therefore, the support member 23 axially moves along the guide member 22 towards the tip end thereof (rightwards in FIG. 1) and the unchucked tool 26 is withdrawn out of the spindle 11 while being held by the pair of claw pieces 28 and 29.

The axial movement of the support member 23 is stopped when the stopper surface 34 thereof is brought into engagement with the stopper 33 of the driving shaft 30. At this time, the engaging member 36 is aligned with the escape groove 38 connected with the groove 35 and thus, is caused to slide on the inclined bottom surface of the escape groove 38 to be disengaged from the groove 35 as a result of the clockwise rotation of the tool support member 23. Then, the servomotor 41 is restarted to rotate clockwise whereby another claw mechanism 27 holding the next tool 26 is indexed into axial alignment with the spindle 11. More specifically, absolute values indicating desired indexing positions for the respective claw mechanisms 27 are previously set, then the desired index position corresponding to the claw mechanism 27 which holds the next tool 26 is selected, and next the servomotor 41 is started to rotate clockwise to cause the driving shaft 30 to rotate clockwise. At this time, the absolute encoder 46 outputs an absolute position signal indicating the rotational angular position of the driving shaft 30, and this rotational angular position is compared with the selected desired indexing position. When the above two positions agree with each other, the rotation of the servomotor 41 is stopped. This results in the claw mechanism 27 holding the next tool in front of the spindle 11.

At this time, the engaging member 36 enters into another of the straight grooves 35, which corresponds to the claw mechanism 27 holding the tool 26 to be used next.

It is to be noted that the outstanding feature of the present invention is the capability of indexing any desired tool into alignment with the spindle 11 through one rotational indexing movement by controlling the rotation of the servomotor 41.

Then, the servomotor 41 is rotated counterclockwise to rotate the driving shaft 30 in the same direction by the same amount as that by which the servomotor 41 is rotated clockwise for dismounting the used tool 26 from the spindle 1. Since the engaging member 36 now engaged with another straight groove 35 prevents the support member 23 from rotating counterclockwise, the support member 23 is caused to axially move along the guide member 22 towards the base portion of the driving shaft 30 (leftwards in FIG. 1), thereby inserting the next used tool 26 held by the another holding mechanism 27 into the spindle 11. Then, the spindle 11 chucks the inserted tool 26, and the spindle head 10 is moved downwards to the machining zone. Due to the downward movement of the spindle head 10, the tool 26 chucked by the spindle 11 forcibly opens the claw pieces 28 and 29 and leaves the same.

Figure 3:
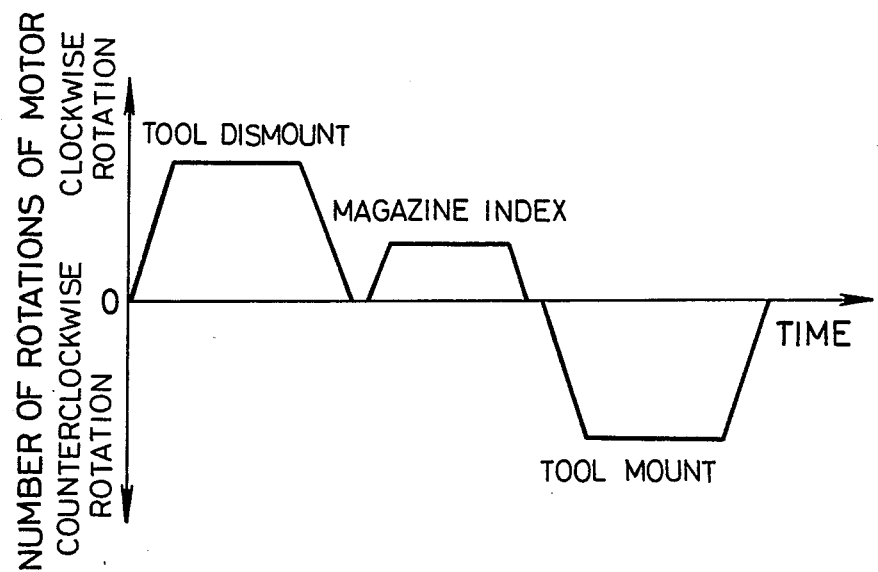
FIG. 3 is a diagram showing the relation between the tool changing steps and the rotation of driving means.

As described above, the tool dismounting step, the magazine indexing step and the tool mounting step are sequentially effected by rotating the servomotor 41 clockwise and counterclockwise. The relation between the operation cycle of the tool changer according to the present invention and the rotation of the servomotor 41 is shown in FIG. 3.

What is claimed is:

1. A tool changer for changing tools to be selectively attached to a tool spindle of a machine, comprising:
    a frame;
    a driving shaft rotatably carried by said frame in parallel relation with the axis of said tool spindle;
    a tool support member carried by said frame in coaxial relation with said driving shaft for rotation about said driving shaft as well as for reciprocative movement in the axial direction of said driving shaft, said tool support member being provided at a circumferential portion thereof with a plurality of tool holding mechanisms for respectively removably holding a plurality of tools;
    feed means provided between said driving shaft and said tool support member for axially moving said tool support member between first and second positions where said tool support member is respectively close to and away from one end of said tool spindle;
    stopper means for defining said second position;
    first guide means provided between said frame and said tool support member for guiding said tool support member to move axially between said first and second positions;
    second guide means provided between said frame and said tool support member for guiding said tool support member to rotate in only one direction when the rotation of said driving shaft in one direction continues even after said tool support member reaches said second position; and
    drive means connected to said driving shaft for rotating the same in said one direction and the other direction respectively.

2. A tool changer according to claim 1, further comprising:
    a sensor for detecting the rotational amount of said drive means so as to enable said tool support member to be stopped when any desired one of said tools held by said tool support member is brought into axial alignment with said tool spindle.

3. A tool changer according to claim 1, wherein said feed means includes:
    a helical spline formed on the external surface of said driving shaft; and
    a portion formed on said tool support member for engagement with said helical spline.

4. A tool changer according to claim 1, wherein said frame is formed with a cylindrical sleeve portion in coaxial relation with said driving shaft, while said tool support member is formed with a hollow body portion snugly receiving said cylindrical sleeve portion therein and wherein said first guide means comprises:
    a plurality of straight grooves formed on one of said cylindrical sleeve portion and said hollow body portion and respectively corresponding to said tool holding mechanisms in number and in angular position;
    an engaging member provided in the other of said cylindrical sleeve portion and said hollow body portion and movable radially of said driving shaft; and
    biasing means for urging said engaging member to be engaged with any one of said straight grooves.

5. A tool changer according to claim 4, wherein said second guide means comprises:
    a plurality of escape grooves respectively communicating with said straight grooves at an axial position thereof where said engaging member is located when said tool support member reaches said second position, each for guiding said engaging member outside any one of said straight grooves communicating therewith so as to permit said tool support member to rotate in only said one direction.

6. A tool changer for changing tools to be mounted on a spindle, comprising:
    a driving shaft having a screw portion formed in an outer periphery of said driving shaft and supported by a frame so as to be rotatable clockwise and counterclockwise;
    a tool support member composed of a cylindrical body disposed coaxially with said driving shaft, which has a screw portion to be engaged with said screw portion of said driving shaft in an inner periphery of said tool support member;
    a first guide means for guiding said tool support member to be moved forwardly or backwardly in an axial direction with the clockwise or counterclockwise rotation of said driving shaft, and a second guide means for guiding said tool support member to be rotated in one direction together with said driving shaft at an end of the forward movement of said tool support member;
    a plurality of tool holding mechanisms provided in an outer periphery of said tool support member at predetermined distances in the circumferential direction for engageably and disengageably holding various tools;
    drive means for rotating said driving shaft clockwise so as to move said tool support member forwardly from an end of its backward movement, and rotate said tool support member through a predetermined angular distance at an end of the forward movement of said tool support member, and rotating said driving shaft counterclockwise so as to move tool support member backwardly to an end of the backward movement of said tool support member; and
    rotating angle detecting means for detecting the rotating angle of said driving shaft.

7. A tool changer according to claim 6, wherein said tool support member is a cylindrical double-walled body composed of an inner cylindrical wall and an outer cylindrical wall, said screw portion is formed in an inner periphery of said inner cylindrical wall, said plurality of tool holding mechanisms are provided in an outer periphery of said outer cylindrical wall, said first guide means is composed of a plurality of straight grooves formed in an outer periphery of a cylindrical body which is interposed between said inner cylindrical wall and said outer cylindrical wall, each of said straight grooves has a rectangular section and axially extends so as to correspond to each of said tool holding mechanisms, said second guide means is composed of a plurality of escape grooves, each of which communicates with one end portion of each of said straight grooves, each of said escape grooves has an inclined surface extending from a bottom of said each of straight grooves to the outer periphery of said cylindrical body in one rotational direction of said tool support member, an engaging member is provided at one position of an inner periphery of said outer cylindrical wall, said engaging member is biassed by a spring member and projects from an inner peripheral surface of said outer cylindrical wall, said engaging member fits in one of said plurality of straight grooves to enable the forward and backward movement of said tool support member along one of said plurality of straight grooves with the rotation of said tool support member blocked whereby when said engaging member moves forwardly and reaches one of said escape grooves, which is communicated with one of said plurality of straight grooves, said engaging member disengages from said one of said straight grooves passing said inclined surface of said one of said escape grooves to enable the rotation of said tool support member.

8. A tool changer according to claim 6, wherein said tool holding mechanism is composed of a pair of claw pieces biassed to a closed position by a spring force, said tool holding mechanism holds a tool which forcibly opens said claw pieces and enters into a space defined by said claw pieces, by said spring force, and a tool is disengageable from said claw pieces after forcibly opening said claw pieces.

* * * * *